Oct. 14, 1958

A. E. H. ELMER 2,855,900

FLUID PRESSURE SERVO SYSTEM WITH VALVE ACTUATING
MEANS HAVING A DIFFERENTIAL FEEL
Filed Oct. 25, 1955

INVENTOR
ARTHUR E. H. ELMER

By
Watson, Cole, Grindle & Watson
ATTORNEYS

United States Patent Office
2,855,900
Patented Oct. 14, 1958

2,855,900

FLUID PRESSURE SERVO SYSTEM WITH VALVE ACTUATING MEANS HAVING A DIFFERENTIAL FEEL

Arthur Ernest Henry Elmer, Gloucester, England, assignor to British Messier Limited, Gloucester, England, a British company Application October 25, 1955, Serial No. 542,567

Claims priority, application Great Britain November 2, 1954

8 Claims. (Cl. 121—41)

This invention comprises improvements in or relating to fluid pressure servo mechanisms.

The invention relates to hydraulic booster control systems for the operation of the flying control surfaces of an aircraft and is concerned more particularly with such systems which are provided with means for imparting "artificial feel" to the pilot through his control linkage to enable him to be aware of the extent of any external forces acting upon the control surfaces so that he can take immediate action to oppose such forces.

In their simplest form such systems comprise an hydraulic booster arrangement and a pre-loaded spring in the input or output circuit thereof to provide "artificial feel."

More complicated mechanical systems have been evolved to provide more sensitive "feel" characteristics but it has been found that such systems are not altogether successful in service due to wear of their moving parts which has given rise to backlash and consequent reduction in sensitivity.

Further it has been found that an hydraulic booster arrangement which satisfactorily controls an aerofoil surface at low flight speeds may not satisfactorily control the surface at high flight speeds.

It is an object of this invention to provide a servo mechanism or booster in which "feel" is provided and which is of simpler construction than the more sensitive constructions hitherto adopted and which avoids the difficulties due to backlash.

It is the object of this invention to provide an hydraulic booster control system which is capable of satisfactorily controlling an aerofoil surface throughout a wide flight speed range and in which "differential feel" is hydraulically imparted to the pilot in a simple and practical manner without the necessity of complex mechanical linkages.

According to one feature of the present invention a servo mechanism comprises in combination a motor the movable member of which is operatively connected to the load, a control valve in the form of a piston valve and valve casing of which control valve one part is coupled to the movable member of the motor to move therewith and the other part is coupled to a control, and piston means on the piston valve which are subject to the actuating pressure of the motor jack to oppose the control and so provide "feel."

Preferably the control is coupled to the control valve through the intermediary of a centering spring. Such a spring limits the "feel" in the event of a strong force being brought to bear upon the element which is moved by the mechanism as for example may happen in the case of a surface in a flying control system on aircraft in the event of increasing aerodynamic load causing the surface to "blow back."

Preferably the control member of the servo mechanism is further coupled to the control valve, not only by the centering spring but by a piston to which the actuating pressure of the motor has access. The control may take the form of a piston rod which passes through a cylinder formed within the piston valve and carrying a piston within said cylinder, the centering spring being located on a spring casing which surrounds an extension of the said rod and is attached to the end of the piston valve.

One example of a construction in accordance with the invention will now be described with reference to the accompanying diagrammatic drawing which shows the layout of the parts and the hydraulic connections between them:

The pilot's input to the flying control system shown comprises a rod member 11 which is provided approximately half way along its length with a piston 12 integral therewith and further along its length remote from a pivotal connection 13, with two shoulders 14 and 15 which are spaced some way apart. This rod member 11 is slidably mounted within a hollow valve member 16, closed at either end except for apertures 17 and 18 through which the rod member passes. The valve member is provided with lands 19, 20, 21 and 22. Radial ports 23 and 24 extend from the interior to the exterior of the valve member and are situated to the left and right-hand sides of lands 19 and 22, respectively in the drawing. A passage 16a connects the space between lands 19 and 20 with a space beyond the left-hand end of the valve member while a passage 16b connects the space between lands 21 and 22 with a space around the right-hand end of the valve member. The valve member is slidably mounted in a fixed valve casing 25, the right-hand end thereof being supported in an aperture 26 in the otherwise closed right-hand end of the valve casing 25, and the rod member 11 being slidably supported in an aperture 27 in the otherwise closed left-hand end of the casing. It will be understood that piston 12 is a sliding fit in the bore of valve member 16. The bore of valve casing 25 is stepped in diameter near its left-hand end to form a sliding support for the left-hand end of the valve member. The casing is provided with radial inlet ports 28 which open from a fluid supply passage 29 into the annular space 30 between lands 20 and 21. A passage 31 extends from ports 28 for a purpose which will be described later. Pairs of radial ports 32, 33 of smaller diameter than ports 28 extend through the casing and one of each pair is spaced from the other lengthwise of the valve so that when the valve member 16 is in the equilibrium position land 20 is disposed between them, both being unobstructed by the land. Similarly pairs of radial ports 34, 35 are provided in the casing such that when the valve is in the equilibrium position land 21 is disposed between them but does not obstruct them. The annular space 36 to the left of land 19 in the drawing communicates through radial ports 37 with a passage 38 which also connects with the pairs of ports 32, 33. The annular space 39 to the right of land 22 communicates through radial ports 40 with a passage 41 which also connects with the pairs of ports 34, 35. The annular space 42 beyond the left-hand end of the valve member 16 communicates via one or more radial ports 43 with a drain passage 44.

Integral and coaxial with the right-hand end of the valve member 16 is a tubular extension 16c which is approximately the same length as the valve member itself but of a diameter which is slightly larger than the outside diameter of the valve member. The internal diameter of the tube is such that a step 45 is provided at its left-hand end against which step and the right-hand side of shoulder 14 a circular member 46 is urged by a coil spring 47. The right-hand end of the tube has an inwardly directed flange 16d against which and the left-hand side of shoulder 15 a second circular member 48 is urged by the other end of the coil spring 47. The extreme right-hand end of the rod 11 is slidingly supported in a bearing 49. A tubular casing 50 surrounds this tubular extension 16c thereby forming a jacket into which the passage 16b leads. A return passage 51 leads from this jacket.

Pivotally connected at 13 to the input rod 11 is an arm 52 which at its opposite end is pivotally connected at 53 to a plate 54 which is pivotally mounted with respect to the aircraft structure at 55 and provided with a notch 56 and a number of steps 56a on either side of the notch along one edge of the plate.

A passage 57 branches from the fluid supply passage 29 and leads to a cylinder 58 which houses a piston 59 and piston rod 60, this rod extending to the left in the drawing through an aperture 61 in the end of the cylinder. The piston is urged to the left by a coil spring 62 but when pressure is supplied to the system pressure also passes to the left-hand side of the piston and this spring is unbalanced, the piston moving to the right. The piston rod cooperates with the plate 54 so as to lock the system on failure of the fluid pressure supply as will be described later.

The control surface 63 which is to be operated is pivotally connected at 64 to the aircraft structure and a lever 65 integral therewith is pivotally connected at 66 to a hollow rod 67. A jack cylinder 68 is fixed to the other end of the hollow rod and slidably mounted in this cylinder is a piston 69 which is fixed to a rod 70. That part of the rod to the left of piston 69 passes through a gland 71 at the left-hand end of the cylinder and at its extreme end is pivotally connected at 72 to the airframe 73. That part of the rod to the right of piston 69 passes through a gland 74 at the other end of the cylinder and extends for some way into the hollow rod 67. Cylinder 68 is provided with ports 75 and 76 on either side of piston 69 and passages 38 and 41 respectively lead to these ports. Passage 31 connects with a port 77 at the right-hand end of a cylinder 78. A passage 79 branches from passage 38 and leads to a port 80 at the left-hand end of the cylinder 78. A piston 81 and a piston rod 82 are housed in this cylinder, the end of the piston rod being chamfered and normally closing the port 80 when fluid pressure is supplied to the system. A passage 83 branches from passage 41 and leads to a port 84 in the wall of the cylinder 78 near its left-hand end.

It will be appreciated that in order to obtain the necessary follow-up servo-action providing a centered or neutral equilibrium position of the valve spool 16 for each setting of the pilot's input control and corresponding position of the control surface 63, the valve casing 25 must move with the output rod 67 of the servo-motor or jack. Accordingly, as will be seen indicated in the drawings, the servo-motor or jack cylinder 68 and the valve casing 25, together with the casing 50, the lock cylinder 58, the bypass cylinder 78 and the various fluid passages interconnecting them, all form part of a moving unitary structure 85.

The operation of the control system will now be described.

Fluid under pressure is normally continuously supplied through passage 29 and ports 28 to the annular space 30. It also passes through passage 57 to the left-hand side of piston 59 and there acts against the force of coil spring 62 to keep the piston rod 60 out of engagement with the notches 56 or 56a in the plate 54. It also passes from annular space 30 into passage 31 and thence via port 77 to the right-hand side of piston 81 so as to maintain the chamfered extremity of piston rod 82 seated in port 80.

When the valve member 16 is in its equilibrium position and at the same time no unbalanced forces are acting on the control surface 63 fluid is passing from annular space 30 via ports 34, passage 41 and port 76 to the right-hand side of jack piston 69 and also via ports 34 and 35, the space between lands 21 and 22, passage 16b and the space enclosed by tubular casing 50 to the return passage 51. Fluid is also passing through passage 41 and port 40 to the annular space 39.

Similarly fluid at equal pressure passes from the annular space 30 via ports 33, passage 38 and port 75 to the left-hand side of jack piston 69, and also via ports 33 and 32, the space between lands 19 and 20, passage 16a, annular space 42 and port 43 to the return passage 44. Fluid is also passing through passage 38 and port 37 to the annular space 36.

Thus it will be seen that under these conditions the pressures on either side of piston 69 are balanced and remain so unless disturbed by external forces acting on the control surface 63. Also the pressures in annular spaces 36 and 39 are balanced so that the valve member 16 remains in the equilibrium position unless disturbed by adjusting movements of the pilot's rod member 11 which movements are transmitted with a certain amount of lost motion through the collars 14 and 15, circular members 46 and 48, spring 47 and tubular extension 16c to the valve 16.

Either side of piston 12 is respectively subjected to the pressures in annular spaces 36 and 39 through ports 23 and 24. Since those spaces communicate respectively with either side of jack piston 69 the pressures transmitted to either side of piston 12 are proportional to the pressures on either side of jack piston 69. Thus when the pilot's rod member 11 is moved the pilot is provided with a certain degree of "feel."

Under low speed flight conditions when the pilot's control rod 11 is moved, say to the right in the drawing, the valve member 16 moves to the right so that land 21 covers the ports 35 and land 20 covers the ports 33. Under these conditions there is not sufficient resistance of the valve member 16 to require compression of spring 47. This only occurs under high speed flight conditions as is described hereinafter. Pressure fluid then passes via ports 34 and passage 41 to the right-hand side of piston 69, while the other side is open to exhaust via passage 38, ports 32, passage 16a and port 43. In this way the cylinder 68 moves to the right together with the hollow rod 67 thereby effecting adjustment of the control surface 63. Simultaneously pressure fluid passes through passage 41 and port 40 to annular space 39 so that as soon as the pilot's manual pressure is released the valve member 16 moves back to the equilibrium position.

If movement of the control surface in the opposite direction is required, the input lever is moved in the opposite direction and the system operates in the opposite sense.

Let it be assumed that under high speed flight conditions, when the control system is in the equilibrium state high aerodynamic unbalancing forces act upon the control surface 63 tending to deflect it downwardly in the drawing, the hollow rod 67 and cylinder 68 move to the left thereby reducing the volume to the right of the piston 69. This increases the pressure therein, which increase is transmitted to the annular space 39. The corresponding reduction in pressure to the left of piston 69 is transmitted to the annular space 36. Consequently the valve member 16 moves to the left, land 21 closing ports 34 and land 20 closing ports 32. Thus passage 41 is open to drain via ports 35 and passage 16b, pressure fluid being admitted only to the left-hand side of piston 69. The differential pressure across piston 69 is proportionally transmitted to the piston 12 so that the pilot is aware of the conditions prevailing by "feel," the proportion depending on the relationship between the areas of pistons 12 and 69.

The pilot therefore moves his control rod 11 to oppose the unbalancing forces. The higher pressure in annular space 39 provides some resistance to rightward movement of the valve member 16 and in order to overcome this resistance the spring 47 has to be compressed to a certain extent before movement of the valve is effected. There is thus a somewhat longer movement of the pilot's control rod which affords improved feel characteristics. Consequent movement of the valve member 16 results in the reduction of pressure to the left of piston 69 and the increase of pressure to the right of it to overcome the unbalancing forces and move the control surface back to its original position.

It will be understood that if the unbalancing forces act on the control surface in the opposite direction the system then operates in the opposite sense.

If the supply pressure to the system should fail then piston 59 would be urged to the left by the coil spring 62, the piston rod 60 engaging the notches 56 or 56a to lock the pilot's control rod 11. Also the pressure would be relieved to the right of piston 81 so that the chamfered extremity of piston rod 82 would be unseated. In this way both sides of the jack piston 69 would be placed in communication through port 75, passages 38 and 79, ports 80 and 84, passages 83 and port 76. In this way the control surface 63 would adopt a neutral position so that the aircraft could be brought home on trimming tabs.

I claim:

1. A servo-mechanism comprising in combination a fluid-operated servo-motor having a movable output member which is operatively connected to the load, a control valve for controlling the admission and exhaust of pressure fluid to and from the servo-motor said valve having two relatively movable parts one of which is in the form of a valve casing and the other a valve-member slidable therein, feel-generating piston means associated with said valve member and subject to the pressure differential in the servo-motor in a directional sense such as to oppose control movements of the valve member in the valve casing and so provide feel, a control member and operative connections between the control member and one part of the control valve, the other part of the control valve being coupled to move with the movable output member of the servo-motor, and a resiliently-yielding connection in the operative connections between the control member and the control valve such that under low load conditions said connections provide a substantially rigid coupling between the control member and the one part of the control valve while under high load conditions the resiliently-yielding connection yields to varying extents according to load.

2. A servo-mechanism comprising in combination a fluid-operated servo-motor having a movable output member which is operatively connected to the load, a control valve for controlling the admission and exhaust of pressure fluid to and from the servo-motor, said valve having two relatively movable parts one of which is in the form of a valve casing and the other a valve-member slidable therein, primary feel-generating piston means associated with said valve member and subject to the pressure differential in the servo-motor in a directional sense such as to oppose control movements of the valve member in the valve casing and so provide feel, a secondary feel-generator having two relatively movable parts one in the form of a cylinder and the other a piston working therein, a control member coupled to move one part of the secondary feel-generator, the other part of the secondary feel-generator being united to move as one with one part of the control valve while the other part of the control valve is coupled to move with the movable output member of the servo-motor, the piston of the secondary feel-generator being subject to the pressure differential in the servo-motor in a directional sense such as to oppose control movements, and operative connections between the two parts of the secondary feel-generator including a resiliently-yielding connection such that under low load conditions the two parts move together and the secondary feel-generator provides a substantially rigid coupling between the control member and the one part of the control valve, with feel provided by substantially only the primary feel-generating means, while under high load conditions the resiliently-yielding connection yields sufficiently to allow the two parts of the secondary feel-generator to move relatively and provide additional feel.

3. A servo-mechanism comprising in combination a fluid-operated servo-motor having a movable output member which is operatively connected to the load, a control valve for controlling the admission and exhaust of pressure fluid to and from the servo-motor said valve having a valve casing and a valve-spool slidable therein, primary feel-generating piston means on said valve spool and subject to the pressure differential in the servo-motor in a directional sense such as to oppose control movements of the valve spool in the valve casing and so provide feel, a secondary feel-generator having a cylinder and a piston working therein, a control member coupled to move the piston of the secondary feel-generator, the cylinder of the secondary feel-generator being united to move as one with the valve spool of the control valve while the valve casing is coupled to move with the movable output member of the servo-motor, the piston of the secondary feel-generator being subject to the pressure differential in the servo-motor in a directional sense such as to oppose control movements, and operative connections between the cylinder and piston of the secondary feel-generator including a resiliently-yielding connection such that under low load conditions the cylinder and piston move together and the secondary feel-generator provides a substantially rigid coupling between the control member and the valve spool of the control valve, with feel provided by substantially only the primary feel-generating means, while under high load conditions the resiliently-yielding connection yields sufficiently to allow the cylinder and piston of the secondary feel-generator to move relatively and provide additional feel.

4. A servo-mechanism comprising in combination a fluid-operated servo-motor in the form of a double-acting piston-and-cylinder unit having an anchored piston and a movable cylinder which is operatively connected to the load, a control valve for controlling the admission and exhaust of pressure fluid to and from the servo-motor, said valve having a valve casing and a valve spool slidable therein, primary feel-generating piston means on said valve spool and subject to the pressure differential across the servo-motor piston in a directional sense such as to oppose control movements of the valve spool in the valve casing and so provide feel, a secondary feel-generator having two relatively movable parts one in the form of a cylinder and the other a piston working therein, a control member coupled to move one part of the secondary feel-generator, the other part of the secondary feel-generator being united to move as one with the valve spool of the control valve while the casing of the control valve is united to move as one with the cylinder of the servo-motor, the piston of the secondary feel-generator being subject to the pressure differential across the servo-motor piston in a directional sense such as to oppose control movements, and operative connections between the two parts of the secondary feel-generator including a yielding spring connection such that under low load conditions the two parts move together and the secondary feel-generator provides a substantially rigid coupling between the control member and the valve spool of the control valve, with feel provided by substantially only the primary feel-generating means, while under high load conditions the spring connection yields sufficiently to allow the two parts of the secondary feel-generator to move relatively and provide additional feel.

5. A servo-mechanism comprising in combination a fluid-operated servo-motor having a movable output member which is operatively connected to the load, a control valve for controlling the admission and exhaust of pressure fluid to and from the servo-motor, said valve having a valve casing coupled to move with the movable output member of the servo-motor and a hollow-bored valve-spool slidable in said casing, primary feel-generating piston-means on the exterior of said valve-spool and subject to the pressure differential in the servo-motor in a directional sense such as to oppose control movements of the valve-spool in the valve casing and so provide feel, a secondary feel-generator disposed coaxially within the control valve and having a cylinder constituted by the bore in the hollow valve spool and a piston working therein, a control member coupled to move the piston of the secondary feel-generator, said piston being subject to the pressure differential in the servo-motor in a directional sense such as to oppose control movements, and operative connections between the piston of the secondary feel-generator and the valve spool including a resiliently-yielding connection such that under low load conditions the piston and valve spool move together, with feel provided by substantially only the primary feel-generating means, while under high load conditions the resiliently-yielding connection yields sufficiently to allow said piston and valve spool to move relatively and provide additional feel.

6. A servo-mechanism comprising in combination a fluid-operated servo-motor in the form of a double-acting piston-and-cylinder unit having an anchored piston and a movable cylinder which is operatively connected to the load, a control valve for controlling the admission and exhaust of pressure fluid to and from the servo-motor said valve having a ported valve casing united to move as one with the movable cylinder of the servo-motor and a hollow-bored ported valve spool slidable in said casing the valve spool being provided with lands to cooperate with valve ports in the casing, primary feel-generating pistons of annular form on the exterior of said valve spool and subject through further ports in the valve casing to the pressure differential across the servo-motor piston in a directional sense such as to oppose control movements of the valve spool in the valve casing and so provide feel, a secondary feel-generator disposed coaxially within the control valve and having a cylinder constituted by the bore in the hollow valve spool and a piston working therein, a control member coupled to move the piston of the secondary feel-generator said piston being subject through the ports in the valve spool to the pressure differential across the servo-motor piston in a directional sense such as to oppose control movements, and operative connections between the piston of the secondary feel-generator and the valve spool including a yielding spring connection such that under low load conditions said piston and valve spool move together, with feel provided by substantially only the primary feel-generating means, while under high load conditions the spring connection yields sufficiently to allow said piston and valve spool to move relatively and provide additional feel.

7. A servo-mechanism as claimed in claim 5, wherein the hollow valve spool is provided at one end with a tubular extension, the piston of the secondary feel-generator has a rod which extends coaxially through said extension and a coil spring unit with end thrust plates surrounds the rod within the tubular extension and affords the aforesaid yielding connection, opposed shoulders being provided on both the rod and the extension to engage the spring end thrust plates in such manner that the spring is compressed when relative movement of the rod and extension takes place in either direction.

8. A servo-mechanism as claimed in claim 1 and comprising a bypass directly connecting the pressure and exhaust sides of the servo-motor, a normally closed fluid-pressure-operated valve in said bypass, and a normally released fluid-pressure-controlled lock for locking the control member and the movable output member of the servo-motor rigidly together, the bypass valve being arranged to open and the lock to become operative upon failure of the fluid pressure supply to the servo-motor.

References Cited in the file of this patent
UNITED STATES PATENTS

| | | |
|---|---|---|
| 2,219,967 | Thiry | Oct. 29, 1940 |
| 2,341,502 | Ingres | Feb. 8, 1944 |
| 2,380,705 | Proctor | July 31, 1945 |
| 2,487,116 | Eaton | Nov. 8, 1949 |
| 2,596,242 | Hill | May 13, 1952 |
| 2,719,511 | Presnell | Oct. 4, 1955 |

FOREIGN PATENTS

| | | |
|---|---|---|
| 314,523 | Germany | Sept. 25, 1919 |